(12) United States Patent
Fransisco

(10) Patent No.: US 8,572,823 B1
(45) Date of Patent: Nov. 5, 2013

(54) SYSTEM AND METHOD FOR TRACKING A DECEASED BODY

(75) Inventor: Ray Kingston Fransisco, Wagoner, OK (US)

(73) Assignee: DNA Pros, Inc., Lee's Summit, MO (US)

( * ) Notice: Subject to any disclaimer, the term of this patent is extended or adjusted under 35 U.S.C. 154(b) by 684 days.

(21) Appl. No.: 12/689,715

(22) Filed: Jan. 19, 2010

Related U.S. Application Data

(60) Provisional application No. 61/150,593, filed on Feb. 6, 2009.

(51) Int. Cl.
*A61G 17/00* (2006.01)

(52) U.S. Cl.
USPC .................................. 27/1; 110/194; 700/225

(58) Field of Classification Search
USPC ......... 27/1; 110/194, 341; 235/375; 700/215, 700/225; 40/633
See application file for complete search history.

(56) References Cited

U.S. PATENT DOCUMENTS

| | | | |
|---|---|---|---|
| 3,654,675 A * | 4/1972 | Peterson | 27/1 |
| 6,340,978 B1 * | 1/2002 | Mindrum | 715/764 |
| 6,604,018 B2 * | 8/2003 | Richard | 700/225 |
| 6,948,271 B2 * | 9/2005 | Helgeson et al. | 40/633 |
| 7,178,209 B1 * | 2/2007 | Radziewicz | 27/1 |
| 7,191,498 B2 * | 3/2007 | Fischer | 27/1 |
| 7,210,203 B1 * | 5/2007 | Wimprine, Jr. | 27/1 |
| 7,318,261 B2 * | 1/2008 | Bills | 27/1 |
| 7,444,725 B1 * | 11/2008 | Wimprine, Jr. | 27/1 |
| 7,874,050 B2 * | 1/2011 | Bills | 27/1 |
| 7,877,847 B2 * | 2/2011 | Bills | 27/1 |
| 8,292,163 B2 * | 10/2012 | Hershenhorn et al. | 235/375 |

* cited by examiner

*Primary Examiner* — William Miller
(74) *Attorney, Agent, or Firm* — Tomlinson Rust McKinstry Grable

(57) ABSTRACT

A process and apparatus for tracking a deceased body. The apparatus includes a processor and at least one remote computer system adapted to read and store a unique biometric input from a deceased body. The biometric input is catalogued with a unique identifier. Prior to cremation of a deceased body at a crematorium, the biometric input is scanned and matched to stored data to verify the identity of the deceased body. The deceased body is cremated in a retort furnace, processed in cremains processor and stored in a locking urn with the unique identifier such that the identity of the remains is shown.

43 Claims, 11 Drawing Sheets

Visual Identification

Funeral Home Name:
Address:
Phone Number:

The undersigned, having viewed the remains, does hereby positively identify the remains as the body of:

Signed: _____ Date: _____

Name:
Address:
Telephone:

SYSTEM AND METHOD FOR TRACKING A DECEASED BODY

CROSS-REFERENCE TO RELATED APPLICATIONS

This application which claims priority from U.S. Provisional Patent Application Ser. No. 61/150,593 filed on Feb. 6, 2009 entitled CREMATION PROCESS TRACKER WITH LOCKABLE CREMATION URN the contents of which are incorporated herein by this reference.

FIELD OF THE INVENTION

The present invention is generally related to the field of tracking a deceased body through a cremation and more specifically to a system and method for confirming the identity of a deceased body prior to and after cremation.

SUMMARY OF THE INVENTION

The present invention is directed to a system for tracking a deceased body. The system comprises a cremation furnace, a first visual recording device, a first computer system, and a second computer system. The first visual recording device is located proximate the cremation furnace and adapted to generate a visual record of input of the deceased body into the cremation furnace. The first computer system comprises a first data entry mechanism and a first biometric input scanner to generate a first biometric input, a processor and a database. The processor is adapted to assign a unique alphanumeric identifier to the deceased body and the biometric input. The database is adapted to receive and store the first biometric input corresponding to the alphanumeric identifier, and the visual record of input of the deceased body into the cremation furnace. The second computer system is disposed proximate to the cremation furnace. The second computer system comprises a second biometric input scanner adapted to generate a second biometric input and a processor adapted to query the first biometric input to substantially match the first biometric input, the second biometric input, and the alphanumeric identifier.

In another embodiment, the invention is directed to a crematorium. The crematorium comprises a cremation furnace, a computer system, a fingerprint scanner, at least one camera in communication with the computer system, and a database. The fingerprint scanner is in communication with the computer system wherein the fingerprint scanner is adapted to send a fingerprint image to the computer system. The at least one camera is adapted to generate a visual record comprising generation of the fingerprint image and input of a deceased body into the cremation furnace. The database is in communication with the computer system for storing and matching the fingerprint image and the visual record.

In yet another embodiment, the invention is directed to a method for identifying a deceased body. The method comprises the steps of recording a biometric characteristic of an identified deceased body, generating a unique identifier corresponding to the recorded biometric characteristic, transporting the deceased body to a crematorium, scanning the biometric characteristic of the deceased at the crematorium, retrieving the identifier that matches the biometric characteristic, placing a deceased body in a cremation furnace to generate cremains, processing the cremains, recording input of the deceased body into a crematory furnace, removal of the cremains from the crematory furnace, and processing of the cremains, and placing the cremains in the urn.

In still another embodiment, the invention is directed to a method for tracking a deceased body. The deceased body has a stored biometric characteristic and a unique identifier assigned to it. The method comprises receiving the deceased body at a crematorium, scanning the unique biometric characteristic of the deceased body, and matching the scanned biometric characteristic to the stored biometric characteristic to confirm the identity of the body. Thereafter, the method comprises processing the deceased body to generate cremains and placing the cremains in an urn.

Another embodiment for the invention is directed to a method for cataloguing identifying data for cremains. The method comprises scanning a fingerprint of a previously identified deceased body to generate a fingerprint record, matching the fingerprint record to a pre-assigned urn identifier, cremating the deceased body, creating a visual record of the identifier, and creating a visual record of the step of cremating the deceased body.

Yet another embodiment of the invention is directed to a lockable cremation urn. The lockable cremation urn comprises a container, a flange, a top, at least one post, and a slot. The container has an opening. The flange defines a perimeter of the opening. The top is receivable in the flange. The at least one post extends radially from the top or the flange. The slot is in the flange when the post extends from the top, or in the top when the post extends from the flange. The slot is adapted for receiving the at least one post such that the cylindrical top is movable between an unsecured position and a secured position.

Another embodiment of the invention is directed to a method for identifying a deceased body. The method comprises receiving a unique pre-assigned identifier and a corresponding first biometric input, receiving personal data corresponding to the pre-assigned identifier, storing the personal data and unique pre-assigned identifier, receiving a second biometric input, matching the second biometric input to the first biometric input, and sending the pre-assigned identifier upon confirmation that the second biometric input and first biometric input match.

BRIEF DESCRIPTION OF THE DRAWINGS

FIGS. 6A and 6B are representative screenshots from a first computer system preferably operated by funeral home staff.

DETAILED DESCRIPTION OF THE INVENTION

Following the death of an individual the decisions made by the next-of-kin regarding funeral arrangements are often made under extreme emotional conditions and in a severely compressed amount of time. The emotional strain placed on loved ones of the deceased may be compounded if the deceased is accidentally cremated where the family is expecting to bury the deceased body. Thus, a need exists for easy and accurate tracking of a deceased body. The present invention provides a system and method for the positive tracking of a deceased body from identification of the deceased body by the next of kin or family until delivery of the urn containing the cremains to the family or next-of-kin.

Figure 1:
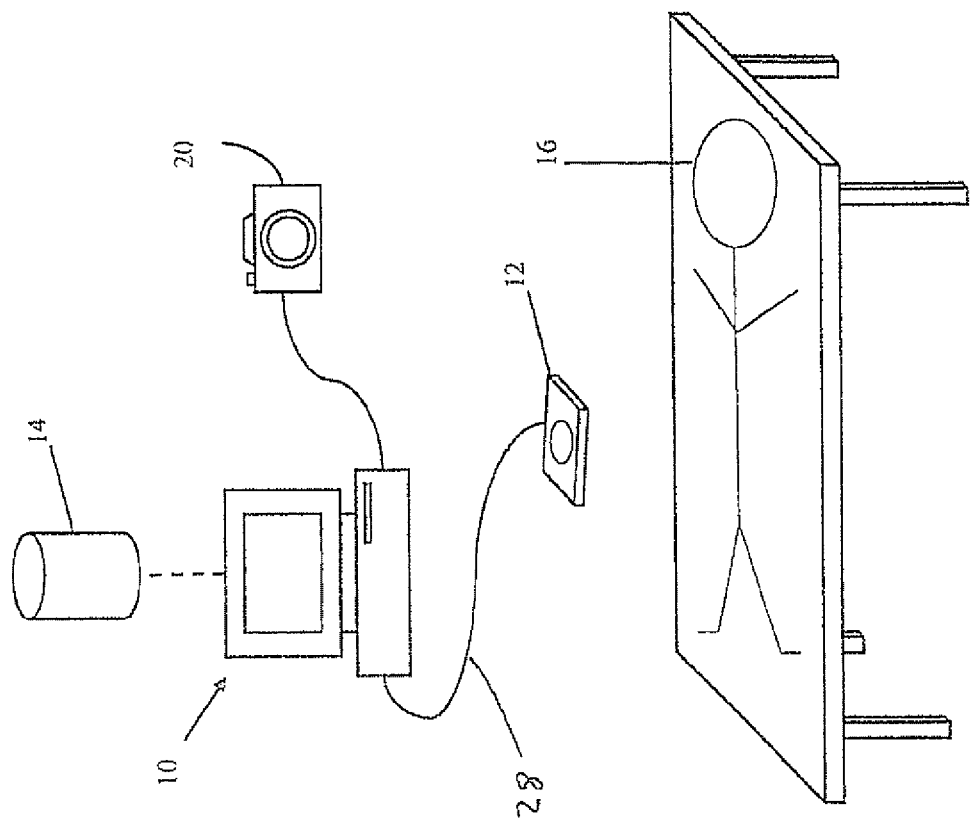
FIG. 1 is a diagrammatic representation of a first location comprising a funeral home showing several components of a system used for tracking a deceased body.

Turning now to the Figures in general, and specifically to FIG. 1, a system for tracking a deceased body is shown. The system of FIG. 1 comprises the components of the system used to intake the deceased body. The system maybe located at a coroner, morgue, funeral home or funeral director's facility. The system of FIG. 1 comprises a first computer system 10. The first computer system 10 comprises a first data entry mechanism such as a keyboard, mouse, or scanner, a first biometric input scanner 12, a processor (not shown), and a database 14. The biometric input scanner 12 is adapted to generate a first biometric input and may comprise a fingerprint scanner, dental imager, or a iris scanner. The first biometric input therefore comprises a unique characteristic of the deceased body, such as a fingerprint, toeprint, dental impression, or iris image. The biometric input seamier 12 may be connected to the computer system 10 via a wire-line 28. Alternatively, the biometric input scanner 12 may communicate with the computer system 10 via a wireless connection method such as Wi-Fi or Bluetooth connection. A signature capture pad (not shown) may be provided at the first computer system 10 for verification of an identity of the deceased body 16 by one or more witnesses.

The processor is designed to generate a unique identifier corresponding to the first biometric input. Preferably, the unique identifier is a multi-character alphanumeric identifier. As will be described later with reference to FIG. 5, the database 14, 102 may be located at a central location apart from the rest of the elements of the first computer system 10. The database 14 is designed to receive and store the first biometric input, the unique identifier, identifying personal information entered by the data entry mechanism, and a visual record including a visual record of input of the deceased body 16 into a cremation furnace, also known to one skilled in the art as a retort 24 (FIG. 2).

A visual recording device 20 may also be connected to the first computer system 10 and used to generate a visual record (not shown) of a physical characteristic of the deceased body 16. The visual record may comprise a video recording and may be sent to the database 14 for storage. The visual recording device 20 may comprise a video camera or a still camera programmed to record images at a predetermined interval. In a preferred embodiment the visual recording device 20 may record a photograph at an interval of at least two (2) frames per minute.

Figure 2:
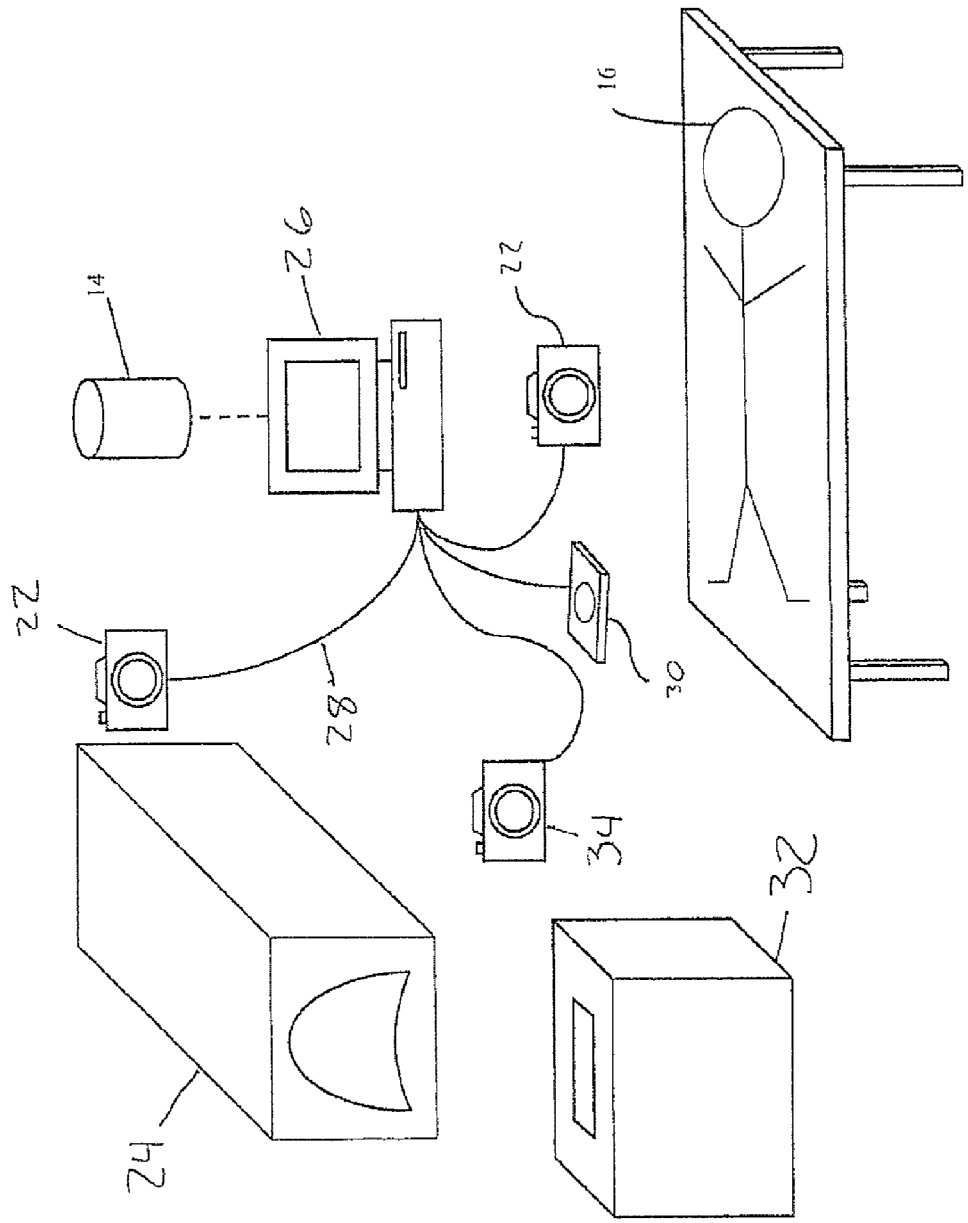
FIG. 2 is a diagrammatic representation of a second location comprising a crematorium and components comprising the system for tracking a deceased body proximate a cremation furnace, or retort.

Turning now to FIG. 2, there is shown therein the portion of the system of the present invention located at the cremation facility, or crematorium. The system shown in FIG. 2 comprises a visual recording device 22 located proximate a retort 24 and connected to a second computer system 26 also disposed proximate to the retort. The retort 24 is adapted to operate at temperatures in excess of 1400 degrees Fahrenheit and sized to receive the deceased body 16. The visual recording device 22 is adapted to generate a visual record of input of the deceased body into the retort 24. The visual recording device 22 may comprise a video camera or still camera connected to the computer system via a wire-line 28. Alternatively, the visual recording device 22 may transmit the visual record of input of the deceased body 16 into the retort 24 via a wireless communication link (not shown).

The second computer system 26 comprises a second biometric input scanner 30 and a processor (not shown). The second biometric input scanner 30 may be adapted to generate a second biometric input comprising a fingerprint, toeprint, iris scan, or other unique biometric characteristic of the deceased body 16. The second biometric input therefore comprises a corresponding data, such as a fingerprint, toeprint or iris image. The processor is adapted to query the first biometric input from the database 14 to substantially match the first biometric input, the second biometric input, and the alphanumeric identifier assigned by the first computer system 10. As discussed hereinafter, the second computer system 26 may be configured to access the first biometric input and the alphanumeric identifier stored by the database 14.

Figure 3:
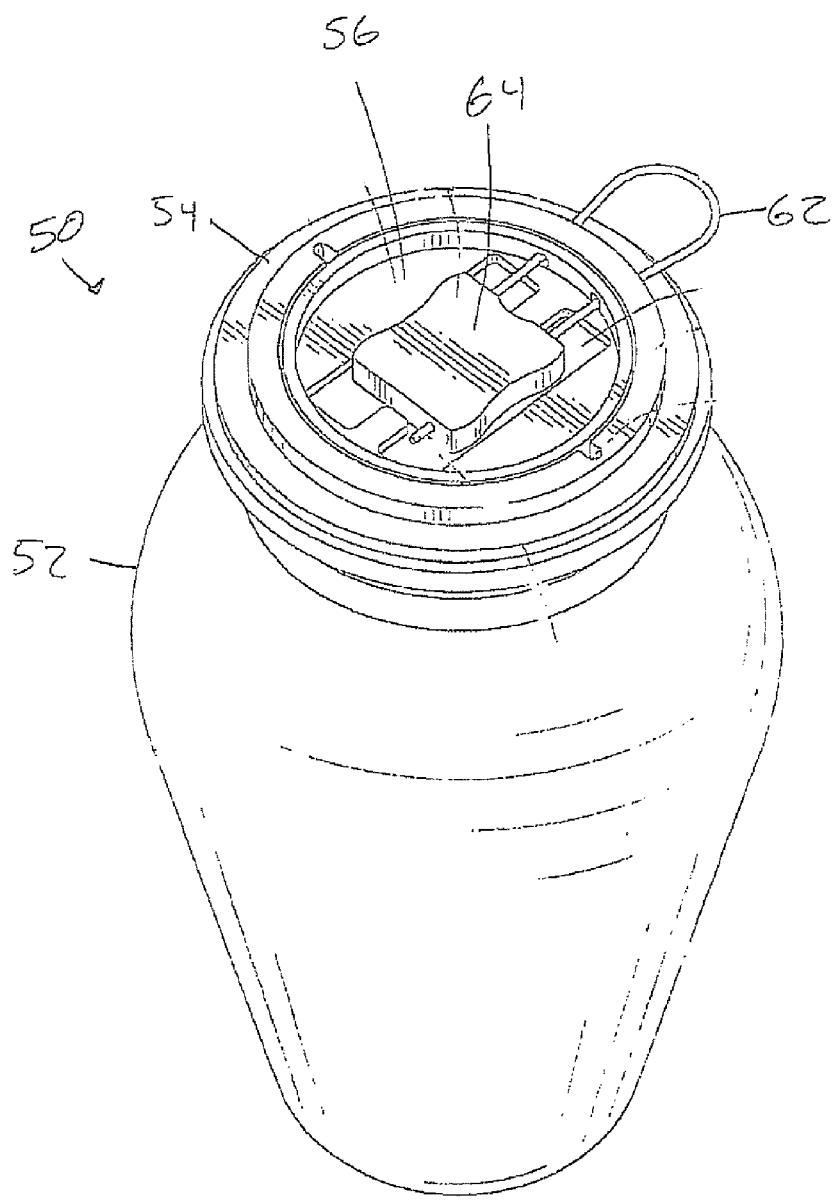
FIG. 3 is a perspective view of an urn having a lockable opening and a locking mechanism which contains a unique serial number.

The system shown in FIG. 2 may further comprise a cremains processor 32 and a visual recording device 34 positioned to record the cremains processor. The visual recording device 34 records the operator's placement of the cremains from the retort 24 into the cremains processor and placement of the processed cremains into an urn 50 (FIG. 3). Alternatively, one camera can be placed such that the functions of the retort 24 and cremains processor 32 can be viewed by one visual recording device. One skilled in the art can appreciate that the second biometric input scanner 30 and an input device, such as a touchpad (not shown), for the second computer system 26 may be located proximate, or attached to, the retort. In this way, the visual recording device 26 may record all the intake procedures and the placement of the body 16 into the retort 24. Visual recording device 20 may comprise a video camera or a still camera programmed to record images at a predetermined interval. A preferred interval may be at least two frames per minute.

Figure 4:
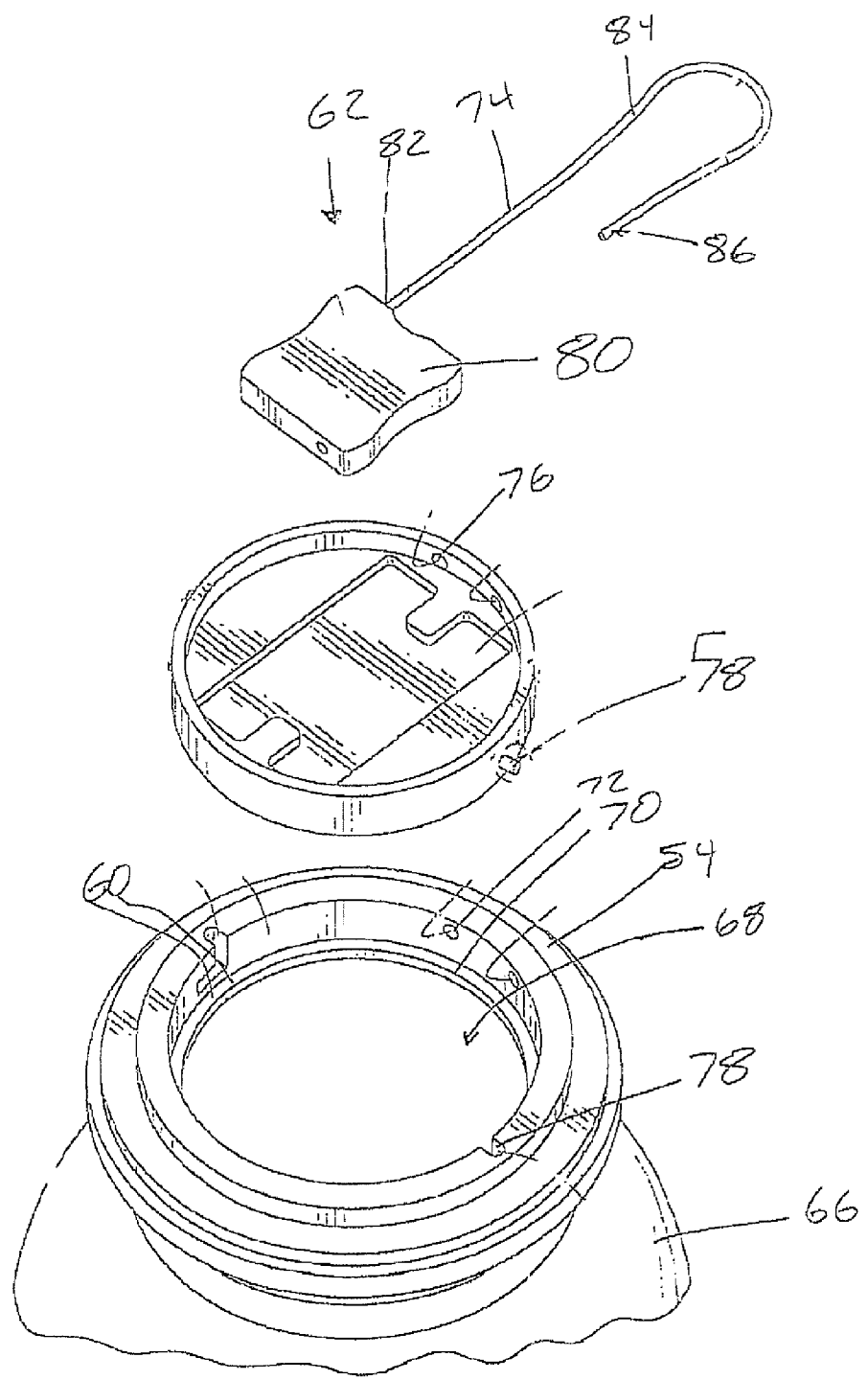
FIG. 4 is an exploded view of the locking mechanism of FIG. 3.

With reference now to FIGS. 3 and 4, shown therein is a preferred embodiment of the urn. Many types of urns may be used with this system, but to provide adequate tracking of the deceased body, a lockable urn 50 should be used and recorded by the visual recording device 34. As shown in FIG. 3, the lockable cremation urn 50 comprises a container 52, a flange 54, a top 56, at least one post 58 (FIG. 4), a slot 60 (FIG. 4), a lock 62 and an identification tag 64 which may have a unique serial number.

With reference to FIG. 4, the container 52 defines an enclosure 66 and an opening 68. Preferably, the opening 68 is located such that when the container 52 is stored, the opening is on the bottom of the urn 50. The flange defines a perimeter 70 of the opening 66, and is adapted to receive the top 56. Preferably, the flange 54 includes a pair of holes 72 for receiving a wire 74. The top 56 is receivable in the flange 54 such that when the top is received within the flange, the opening 66 is closed and the container 52 is substantially sealed. The top 56 may be cylindrical and may include a pair of holes 76 corresponding to the pair of holes 72 in the flange 54 for receiving the wire 74.

Several embodiments for receiving the top in the flange 54 are envisioned, two of which are disclosed below. In the first embodiment as shown in FIG. 4, the top 56 comprises at least one post 58 extending radially from the top. In the first embodiment, the flange 54 comprises the slot 60 adapted for receiving the at least one post 58. The flange 54 further comprises a keyway 78 that provides a narrow entry for the post 58 into the slot 60. The top 56 is rotatable when the post 58 of the top passes into the slot 60 through the keyway 78, such that the post is movable along the slot away from the keyway. Thus, when the post 58 is in the slot 60 apart from the keyway 78, the top 56 is in a "secured" position, and when the post is in the slot at the keyway, the top is in an "unsecured" position. As shown, the keyway 78 is axially aligned.

One skilled in the art will appreciate the top 56 may comprise a slot adapted for receiving the at least one post supported on the flange. The top 56 further comprises a keyway that provides a narrow entry for the post into the slot. When the post of the flange 54 passes into the slot through the keyway, the top 56 may be rotated, moving the slot relative to the post such that the keyway is away from the post. Thus, when the post is in the slot apart from the keyway, the top 56 is in a "secured" position, and when the post is in the slot at the keyway, the top is in an "unsecured" position.

Returning to FIG. 3, the lock 62 comprises a wire 74 and a wire lock 80. The wire 74 comprises a first end 82, a middle section 84, and a second end 86. The wire lock 80 comprises a means for securing the first end 82 and the second end 86 of the wire 74. The urn 50 may be locked by placing the top 56 and flange 54 in the "secured" position such that the holes 72 on the flange correspond to the holes 76 on the top. Preferably, the first end 82 of the wire 74 is secured to the wire lock 80. The middle section 84 of the wire 74 is placed through the holes 76 in the top 56 and the holes 72 in the flange 54. The urn is locked when the second end 86 of the wire 74 is secured to the wire lock 80 with the wire 74 through the holes 72, 76. Accordingly, the contents of the urn 50 may not be accessed or tampered with without destruction of the urn removal of the lock 62.

The identification tag 64 is attached to the lock 62. The identification tag 64 preferably comprises identifying information concerning the cremains of the deceased body 16 within the urn 50. More preferably, the identifying information comprises the unique identifier. The lockable urn 50 and process to lock the urn may be utilized in conjunction with the system and method for tracking a deceased body as disclosed herein.

Figure 5:
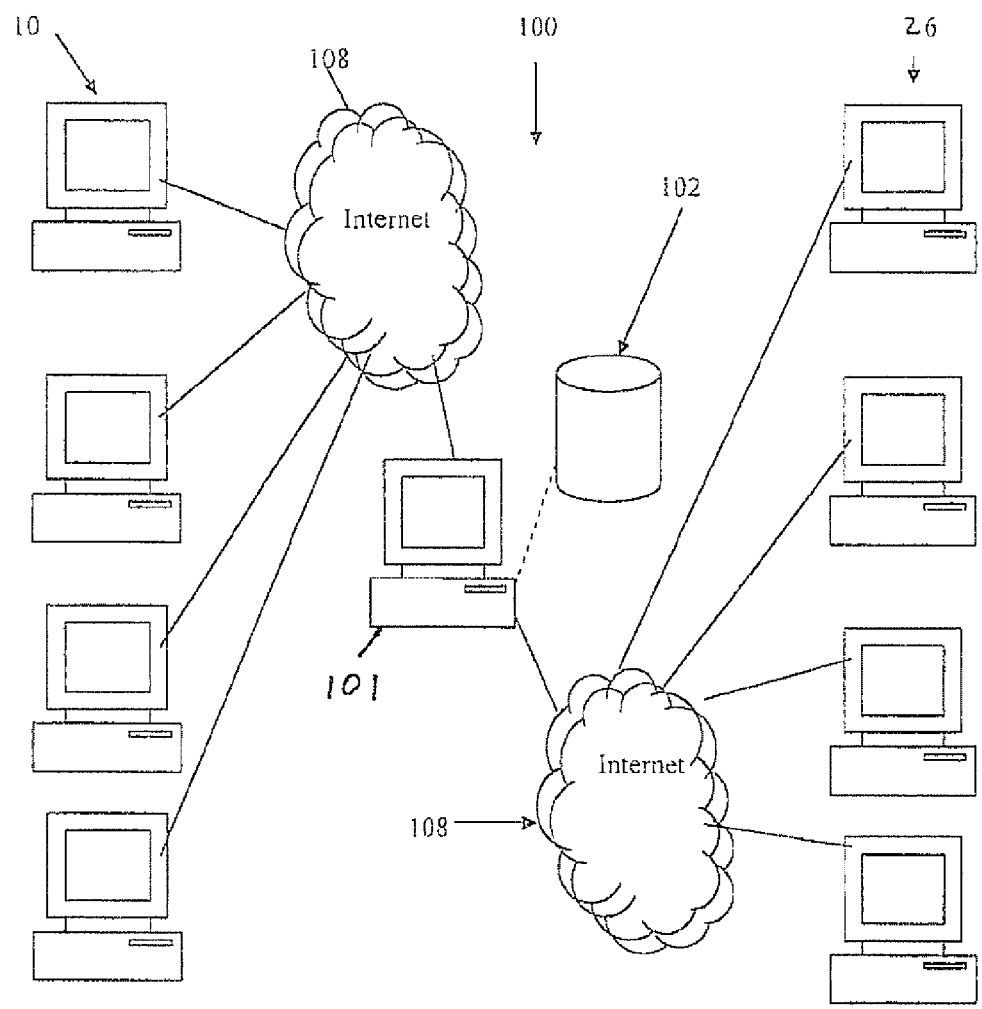
FIG. 5 is a diagrammatic representation of the tracking process of the present invention for tracking multiple deceased bodies.

Turning now to FIG. 5, a system 100 for tracking multiple deceased bodies 16 (FIG. 1) using the present invention is shown. The system comprises the database 102, a plurality of first computer systems 10 located at a plurality of funeral homes, and a plurality of second computer systems 26 located at a plurality of crematoriums. The plurality of first computer systems 10 communicates with a server 101 on which the database 102 is stored by means of the internet 108, or other communication method. As discussed with reference to FIGS. 1 and 10, each of the plurality of first computer system 10 is adapted to transmit information including a pre-assigned unique identifier, personal data and corresponding biometric input to the database 102. The database 102 stores the biometric input and deceased body information with the unique identifier. As discussed with reference to FIGS. 2 and 5, the database 102 is adapted to receive a second biometric input from one of the plurality of second computer systems 26 by means of the internet 108 or other communication method. The database 102 is adapted to match the biometric input to those transmitted from the plurality of first computer systems 10. When a match is found, the database 102 transmits the corresponding unique identifier to the querying second computer system 26.

Figure 6A:
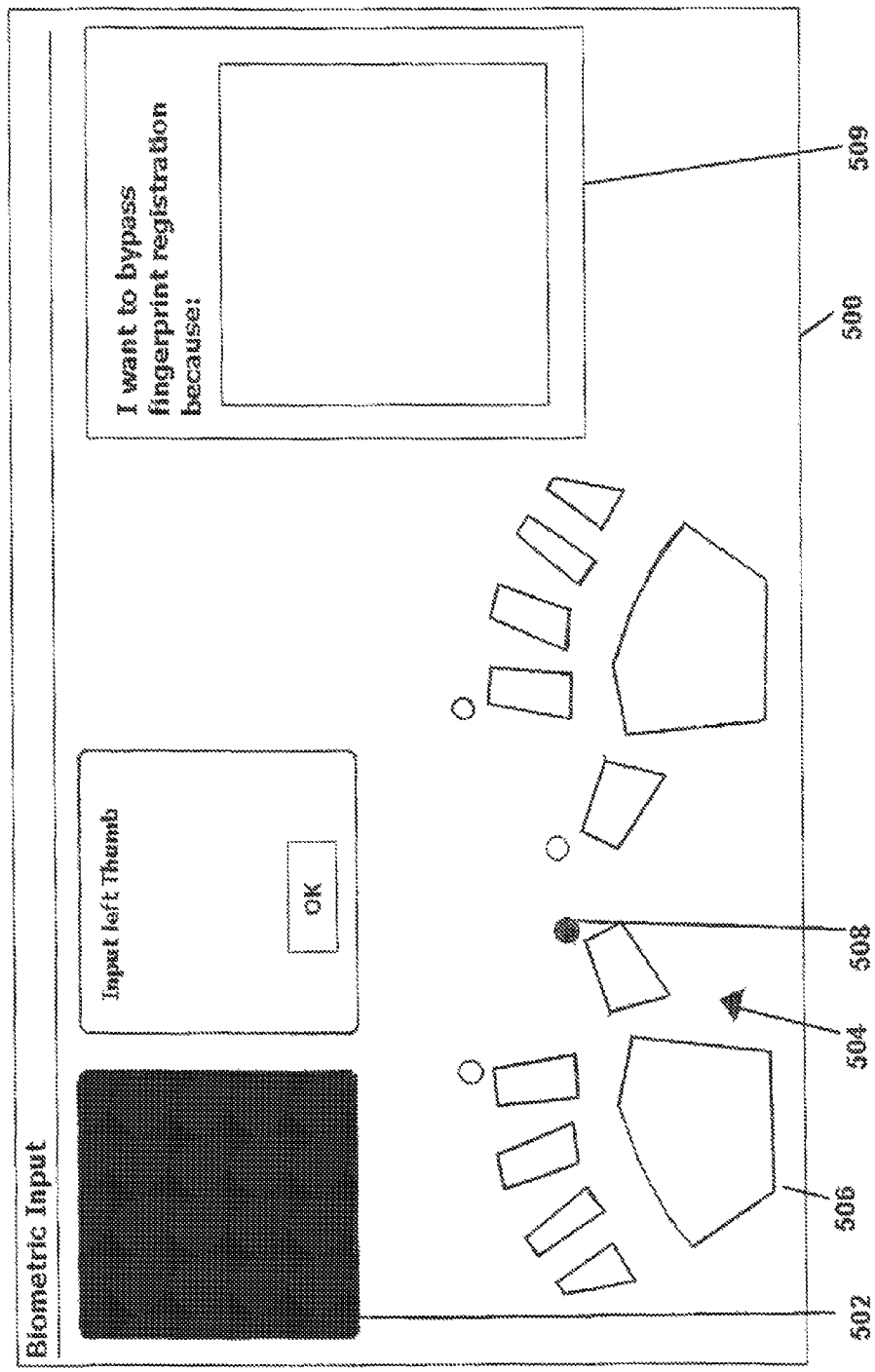

With reference now to FIG. 6A, a first screenshot 500 of the system as seen on the first computer system 10 is shown. The first screenshot 500 comprises an input location 502 for the first biometric input. The first screenshot 500 further comprises prompts 504 to assist an operator in scanning the correct fingerprint of the deceased body 16 in a systematic manner using the biometric input scanner 12 (FIG. 1) and a biometric input viewing location 506. An activated prompt 508 indicates which digit should be scanned. As shown, the left thumb is indicated by an activated prompt 508. In the event fingerprints are not available, bypass of the first screenshot 510 is available by providing an explanation of why a biometric input is unavailable at location 509.

With reference now to FIG. 6B, a second screenshot 510 of the first computer system 10 is shown. The second screenshot 510 comprises an input field 512 to receive the identity of the deceased body. Preferably, the screenshot 510 comprises at least one space 514 to sign, acknowledge the identity of the deceased body. The second screenshot 510 may further comprise a second space 515 for acknowledgement by a second witness. As shown, the screenshot 510 further comprises spaces for funeral home information 516 and spaces for contact information for the acknowledger 518. Preferably, the identifying individual affirms the deceased body's identity using the first data entry mechanism. Preferably, screenshot 510 is unavailable until screenshot 500 of FIG. 6A is completed in full.

Figure 7:
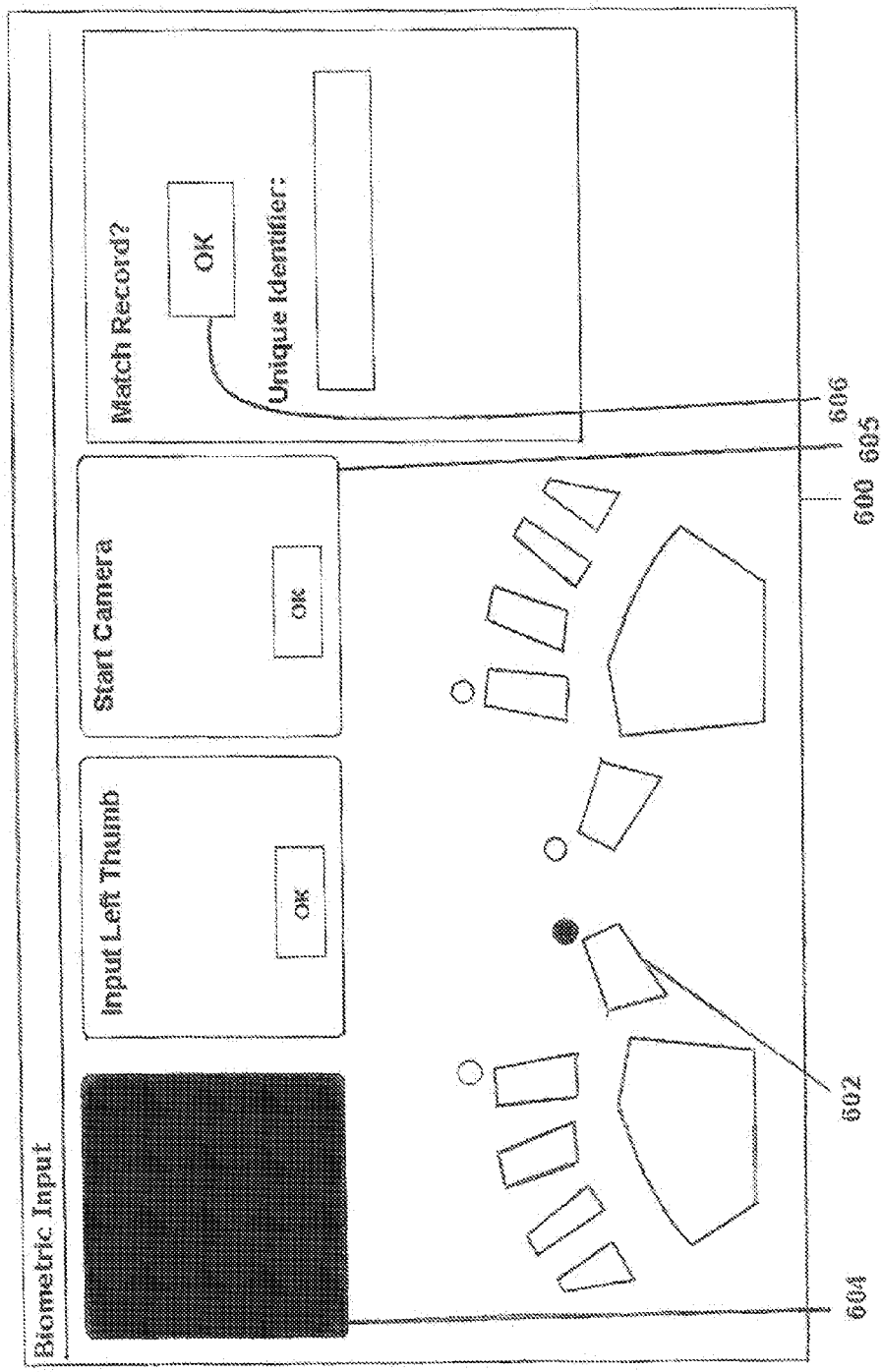
FIG. 7 is a representative screenshot from a second computer system of the present invention located at the crematorium.

With reference now to FIG. 7, a third screenshot 600 of the system as seen on the second computer system 26 is shown. The third screenshot 600 generally follows the second screen shot in the method of the present invention and comprises a biometric input prompt 602 and a unique identifier display 604. The third screenshot 600 comprises a button 605 for activating a camera such as the visual recording device 34. The third screenshot 600 further comprises a button 606 marked "Match Record" such that when the biometric input is received by the second computer system 26, the button is pressed to transmit the biometric input to the server 101. The server 101 searches the database 14 to match the biometric input to a record of many biometric inputs. Upon finding a match, the database 14 transmits the unique identifier to the second computer system 26 for display on the third screenshot 600.

Figure 8:
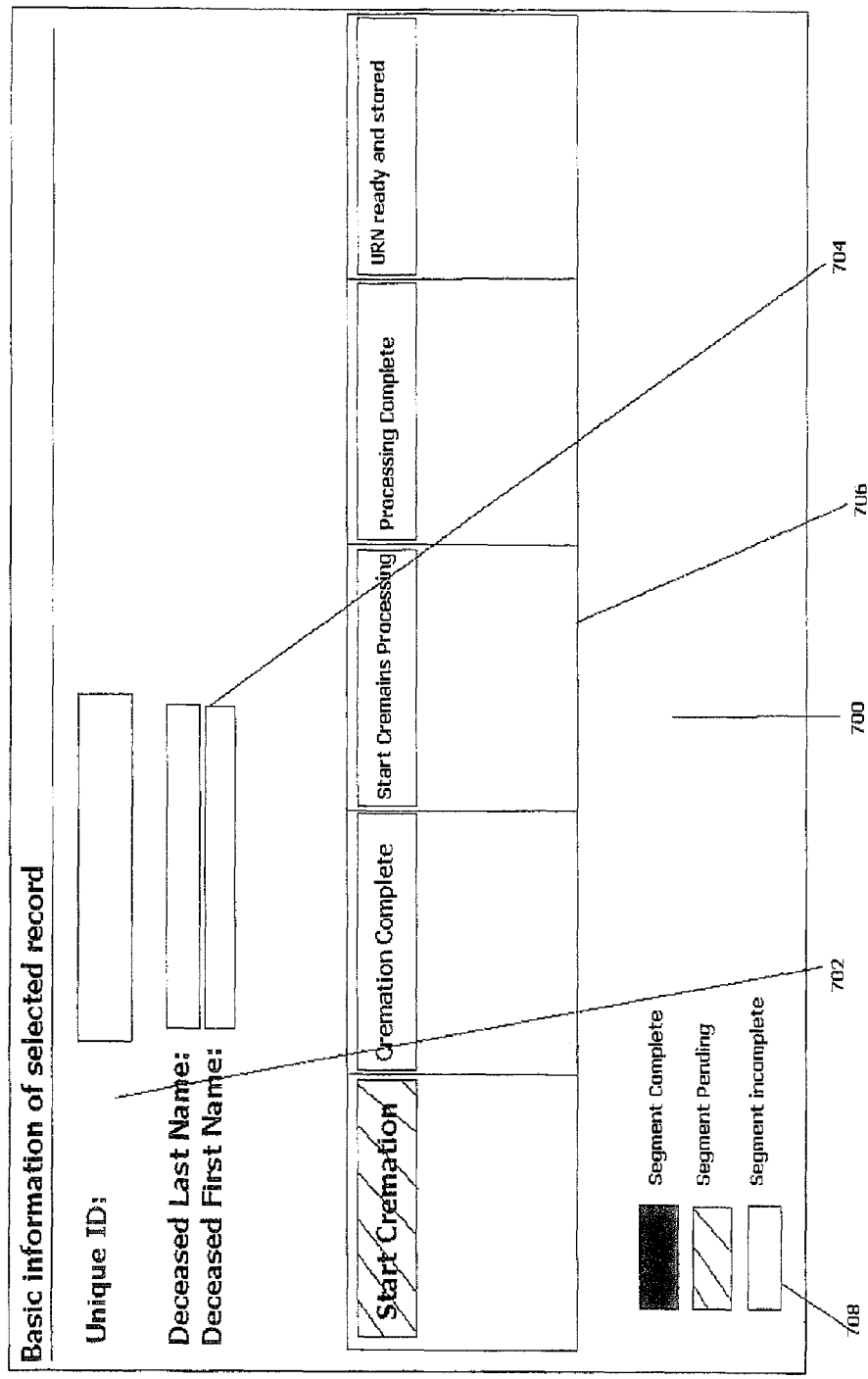
FIG. 8 is a representative screenshot from the second computer system of the present invention showing an interface for use by a crematorium operator to control a visual recording device.

With reference now to FIG. 8, a fourth screenshot 700 of the system as seen on the second computer system 26 (FIG. 2) is shown. The fourth screenshot 700 comprises the unique identifier 702 and deceased body information 704 such as Last Name and First Name fields. The fourth screenshot 700 also comprises a series of progress fields 706 concerning progress of the deceased body through the cremation process. As shown, the checklist comprises the inputs "Start Cremation", "Cremation Complete", "Start Cremains Processing", "Processing Complete", and "URN Ready and Stored." The inputs on the progress fields 706 are shaded according to a legend 708, indicating whether each task is complete, pending, or incomplete. As shown, the step "Start Cremation" is pending. These inputs comprise steps of the method of tracking a deceased body 16 described further with reference to FIG. 9.

Figure 9:
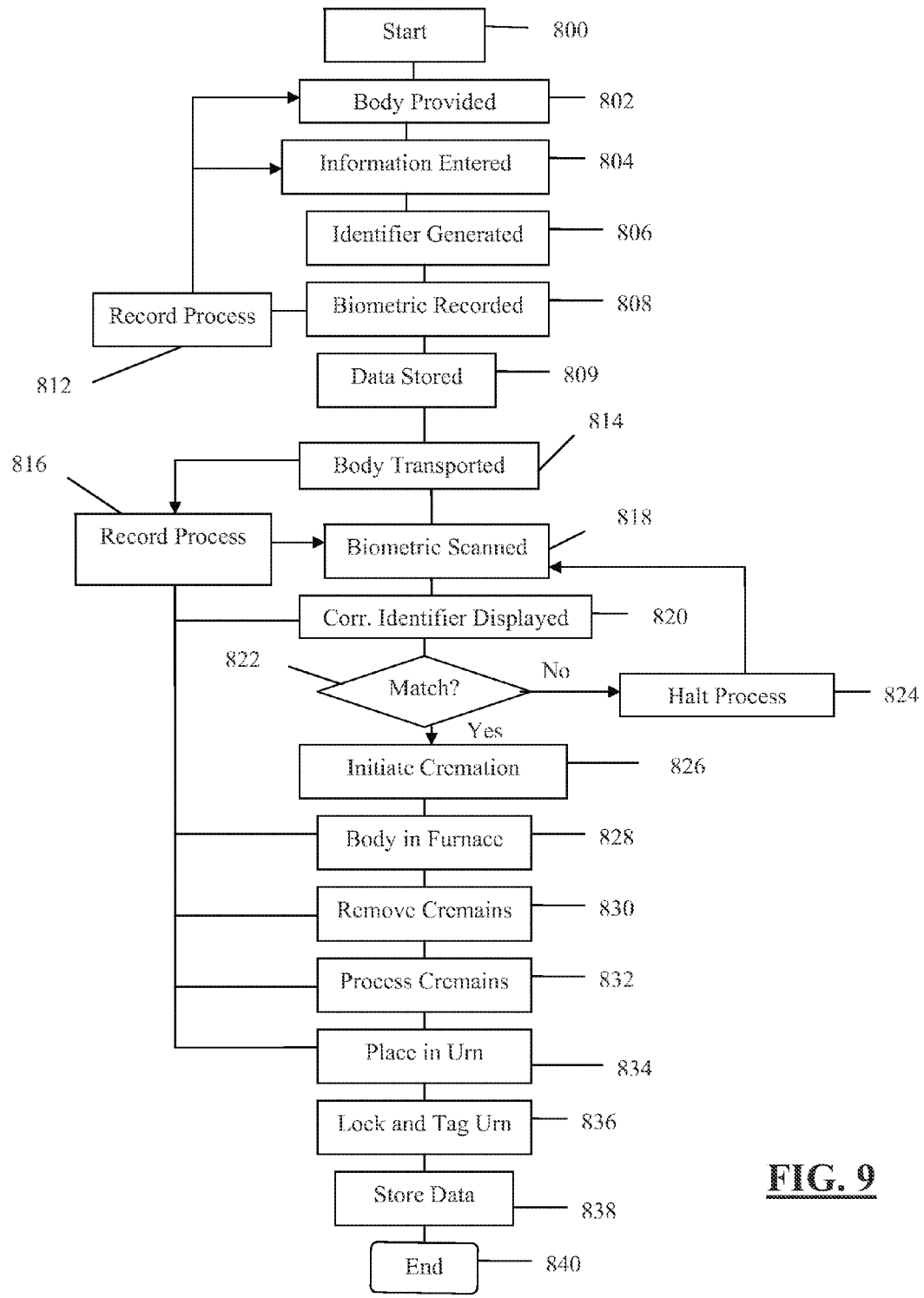
FIG. 9 is a flow chart illustrating a method for tracking a deceased body throughout a cremation process in accordance with the present invention.

With reference now to FIG. 9, a process flow diagram of the method for tracking a deceased body 16 is shown. The method starts at Step 800. A deceased body 16 is entered at the first location at Step 802. Preferably, the first location is a funeral home or morgue. Deceased body 16 information concerning the deceased body is entered into the first computer system 10 at Step 804. Preferably, the deceased body 10 information is provided at Step 804 by a person having knowledge of the deceased body 16 and acknowledged. A unique identifier is assigned to the recorded biometric characteristic and displayed on the first computer system 10 at Step 806. A biometric characteristic of the deceased body 16 is recorded at Step 808 using the first biometric input scanner 12. Preferably, the recorded biometric characteristic is transmitted via a wireless communication link at Step 808. More preferably, the biometric characteristic scanned at Step 808 comprises a fingerprint. Data representing the biometric identifier and corresponding identifier is sent from the first computer system 10 to the server 101 and stored by the database 14 at Step 809. In accordance with the present invention, Steps 802, 804, and 808 may optionally be recorded by the visual recording device 20 (FIG. 1) at Step 812. The deceased body 16 is transported to the second location at Step 814.

The deceased body arrives at the second location and the visual recording devices 22, 34 are activated at Step 816 to record intake of the deceased body at the crematorium. Upon arrival at the crematorium, the biometric characteristic is scanned at Step 818 using the second biometric input scanner 30. The second computer system 26 connects to database 14 to retrieve the biometric characteristic to display the corresponding unique identifier at Step 820. Preferably, the second computer system 26 communicates with the server 101 at Step 820 to display the corresponding identifier via the Internet. At Step 822, an operator of the second computer system 26 matches the unique identifier displayed by the second computer system at Step 820 to the deceased body 16. If the retrieved identifiers do not match at Step 822, the operator ceases the cremation process and informs the first location of the discrepancy at Step 824. The process is halted until the deceased body 16 can be successfully identified as approved for cremation or returned to the funeral director without cremation. Once Steps 818 and 820 are revealed to show matching identifiers at Step 822, the process can continue. If the identifiers match at Step 822, the operator at the second location proceeds to initiate the cremation process at Step 826. The deceased body is placed in the retort 24 and cremated at step 828 to generate cremains. The visual recording device records placement of the deceased body into the retort 24 and records periodic images of the retort door during cremation. After the cremation (Step 828), the cremains are removed from the retort 24 at Step 830 and processed by the cremains processor 32 (Step 832). The processed cremains are placed into a locking urn 50 (Step 834), and the urn is locked and tagged with the identifier (Step 836). Preferably, the visual recording devices 22, 34 activated at Step 816 record Steps 818, 820, 828, 830, 832 and 834 to provide a tracking of the entire cremation process. One skilled in the art will appreciate a single camera may be positioned to create a visual record of the cremation process at at least a rate of two frames per minute. The visual record created by the visual recording device is transmitted to server 101 and stored in the database 14 (Step 838) along with the biometric characteristics recorded at Steps 806 and 818, the identifier generated at Step 808 and the information entered at Step 804. The process ends at Step 840.

Figure 10:
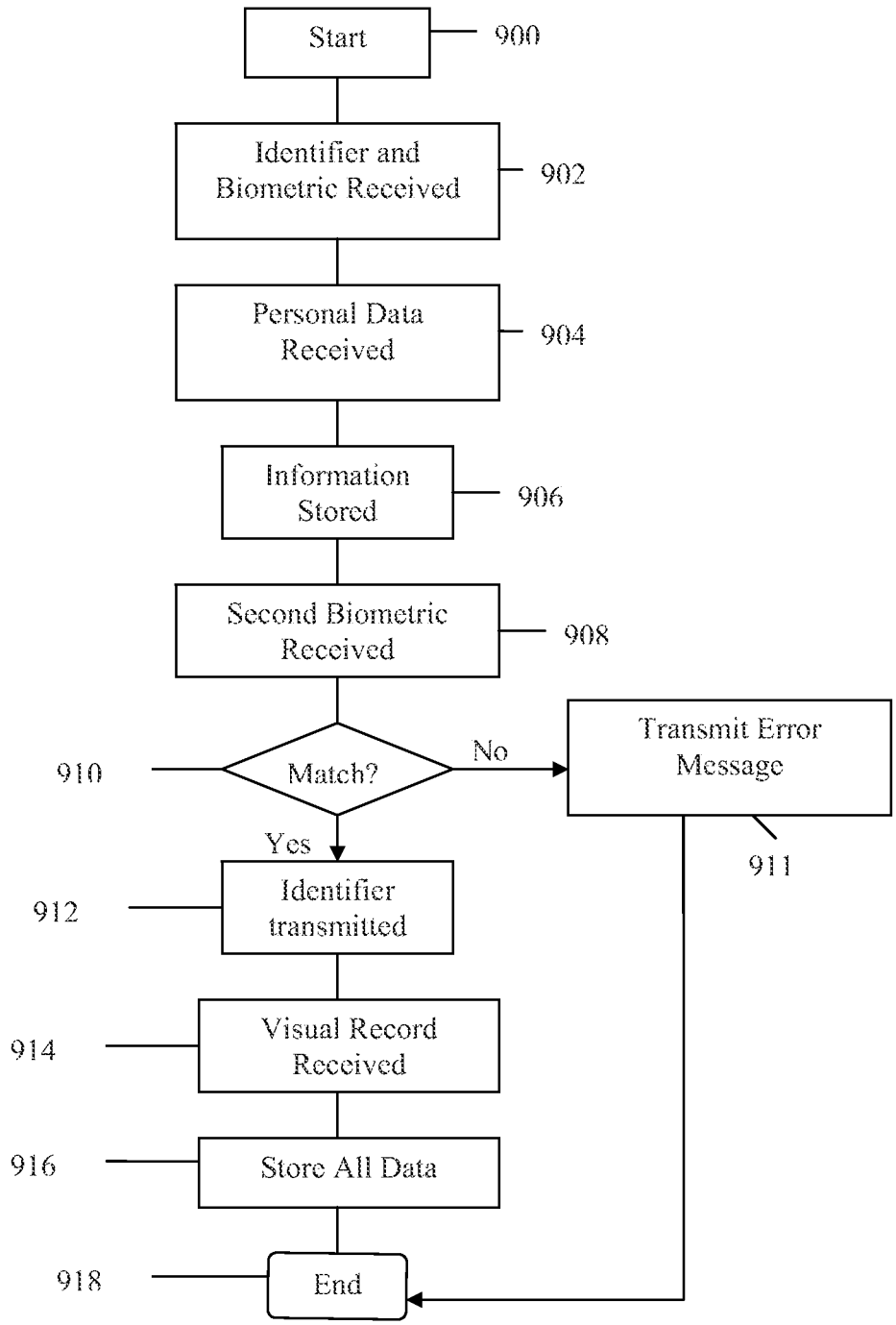
FIG. 10 is a flow chart showing a method for providing information for tracking a deceased body in accordance with the present invention.

A method for identifying a deceased body is shown by the flow diagram of FIG. 10 and starts at Step 900. A unique pre-assigned identifier and a corresponding first biometric input corresponding to a deceased body 16 are stored in the database 14 at Step 902. Personal data corresponding to the pre-assigned identifier is received and stored in database 14 with the identifier and first biometric input at 906. A second biometric input corresponding to the deceased body 16 is sent by the second computer system and received at server 101 at Step 908. The second biometric input is analyzed to determine a matching first biometric input stored in the database 14 at Step 910. If the second biometric input does not match a stored first biometric input, the server 101 transmits a message to the second computer system 26 indicating the error at Step 911. Upon determining that the second biometric input is equivalent to a stored first biometric input, the pre-assigned identifier is transmitted to the second computer system transmitting the second biometric input at Step 912. A visual record of a deceased body 16 being placed into a retort 24 corresponding to the pre-assigned identifier is received from the visual recording device at Step 914. The information is stored in the database (Step 916) and the method is complete (Step 918).

Various modifications in the design and operation of the present invention are contemplated without departing from the spirit of the invention. Thus, while the principal preferred construction and modes of operation of the invention have been illustrated and described in what is now considered to represent its best embodiments it should be understood that the invention may be practiced otherwise than as specifically illustrated and described.

What is claimed is:

1. A system for tracking a deceased body, the system comprising:
    a cremation furnace;
    a first visual recording device located proximate the cremation furnace and adapted to generate a visual record of input of the deceased body into the cremation furnace;
    a first computer system comprising:
        a first data entry mechanism;
        a first biometric input scanner to generate a first biometric input;
        a processor adapted to assign a unique alphanumeric identifier to the deceased body and the biometric input; and
        a database adapted to receive and store the first biometric input corresponding to the alphanumeric identifier, and the visual record of input of the deceased body into the cremation furnace;
    a second computer system disposed proximate to the cremation furnace, the second computer system comprising:
        a second biometric input scanner adapted to generate a second biometric input; and
        a processor adapted to query the first biometric input to substantially match the first biometric input, the second biometric input, and the alphanumeric identifier.

2. The system of claim 1 further comprising a second visual recording device proximate the first computer system.

3. The system of claim 2 wherein the second visual recording device is adapted to generate a second visual record of a physical characteristic of the deceased body wherein the second visual record is sent to the database for storage.

4. The system of claim 1 wherein the first computer system is located at a funeral home.

5. The system of claim 1 further comprising:
    an urn;
    an urn lock; and
    an identification comprising the alphanumeric identifier.

6. The system of claim 5 wherein the identification tag and urn lock are integrally formed.

7. The system of claim 1 wherein the first computer system generates identifying information.

8. The system of claim 1 further comprising a cremains processor.

9. The system of claim 8 wherein the first visual recording device comprises a video camera adapted to record the deceased body entering and exiting the cremation furnace.

10. The system of claim 9 further comprising a second visual recording device positioned to record the cremains processor.

11. The system of claim 10 wherein the first data entry mechanism and first biometric input scanner each comprise a Bluetooth device.

12. The system of claim 10 wherein the first data entry mechanism comprises a smart phone device.

13. The system of claim 1 wherein the first visual recording device is adapted to record at least two frames per minute.

14. A crematorium comprising:
- a cremation furnace;
- a computer system;
- a fingerprint seamier in communication with the computer system wherein the fingerprint scanner is adapted to send a fingerprint image to the computer system;
- at least one camera in communication with the computer system wherein the at least one camera is adapted to generate a visual record comprising generation of the fingerprint image and input of a deceased body into the cremation furnace; and
- a database in communication with the computer system for storing and matching the fingerprint image and the visual record.

15. The crematorium of claim 14 further comprising a cremains processor.

16. The crematorium of claim 15 comprising a second camera in communication with the computer system and adapted to record cremains entering and exiting the cremains processor.

17. The crematorium of claim 14 wherein the computer system is in communication with a remote computer system comprising the database remote from the cremation furnace and computer system.

18. The crematorium of claim 17 further comprising a unique alphanumeric identifier generator.

19. The crematorium of claim 17 wherein the database is adapted to relate the fingerprint image and the visual record.

20. The crematorium of claim 19 wherein the remote computer system comprises a remote fingerprint scanner.

21. The crematorium of claim 14 further comprising a wireless device in communication with the computer system.

22. The crematorium of claim 14 wherein the fingerprint scanner communicates the fingerprint image to the computer system using a wireless communication link.

23. A method of identifying a deceased body comprising:
- recording a biometric characteristic of the identified deceased body;
- generating a unique identifier corresponding to the recorded biometric characteristic;
- transporting the deceased body to a crematorium;
- scanning the biometric characteristic of the deceased at the crematorium;
- retrieving the identifier that matches the biometric characteristic;
- placing the deceased body in a cremation furnace to generate cremains;
- processing the cremains;
- recording input of the deceased body into the crematory furnace, removal of the cremains from the crematory furnace, and processing of the cremains; and
- placing the cremains in an urn.

24. The method of claim 23 further comprising transmitting the recorded biometric characteristic of the identified deceased body to a computer system prior to generating the unique identifier.

25. The method of claim 24 wherein the recorded biometric characteristic is transmitted via a wireless communications link.

26. The method of claim 23 further comprising the step of locking the urn with a lock comprising the unique identifier.

27. The method of claim 23 wherein the biometric characteristic of the identified deceased body is recorded at a funeral home.

28. The method of claim 23 wherein the biometric characteristic of the identified deceased body is recorded at a morgue.

29. A method of tracking a deceased body having a stored biometric characteristic and a unique identifier assigned to the deceased body, the method comprising:
- receiving the deceased body at a crematorium;
- scanning a unique biometric characteristic of the deceased body;
- matching the unique biometric characteristic to the stored biometric characteristic to confirm the identity of the body;
- thereafter, processing the deceased body to generate cremains;
- recording the deceased body as the deceased body is processed to generate cremains; and
- placing the cremains in an urn.

30. The method of claim 29 further comprising retrieving the unique identifier that matches the unique biometric characteristic of the deceased body prior to processing the deceased body.

31. The method of claim 29 further comprising locking the urn.

32. The method of claim 31 further comprising the step of applying a unique identifier associated with a stored identifier to the urn.

33. The method of claim 29 further comprising creating a visual record of the identifier and processing of the deceased body.

34. The method of claim 29 wherein the unique biometric characteristic comprises a fingerprint.

35. A method of cataloguing identifying data for cremains, the method comprising:
- scanning a fingerprint of a previously identified deceased body to generate a fingerprint record;
- matching the fingerprint record to a pre-assigned urn identifier;
- cremating the deceased body;
- creating a visual record of the urn identifier; and
- creating a visual record of the step of cremating the deceased body.

36. The method of claim 35 further comprising placing the cremains in an urn.

37. The method of claim 35 further comprising the step of communicating with a database to match the fingerprint to the urn identifier.

38. The method of claim 35 wherein the database is remote from the cremains.

39. The method of claim 35 wherein a plurality of cameras are used to create the visual record.

40. The method of claim 35 wherein the visual record is created at at least two frames per minute.

41. A method of identifying a deceased body comprising:
- receiving a unique pre-assigned identifier and a corresponding first biometric input of the deceased body;

receiving personal data corresponding to the pre-assigned identifier;

storing the personal data and unique pre-assigned identifier;

receiving a second biometric input of the deceased body;

matching the second biometric input to the first biometric input; and sending the pre-assigned identifier upon confirmation that the second biometric input and first biometric input match.

42. The method of claim 41 further comprising the step of receiving a visual record of the body being placed into a furnace.

43. The method of claim 41 wherein the first biometric input comprises a fingerprint.

* * * * *

UNITED STATES PATENT AND TRADEMARK OFFICE
CERTIFICATE OF CORRECTION

PATENT NO. : 8,572,823 B1
APPLICATION NO. : 12/689715
DATED : November 5, 2013
INVENTOR(S) : Fransisco Page 1 of 1

It is certified that error appears in the above-identified patent and that said Letters Patent is hereby corrected as shown below:

In the Specification

Column 3, line 36, please delete "seamier" and substitute therefore --scanner--.

In the Claims

Column 9, claim 14, line 19, please delete "seamier" and substitute therefore --scanner--.

Signed and Sealed this
Seventeenth Day of December, 2013

Margaret A. Focarino
*Commissioner for Patents of the United States Patent and Trademark Office*